United States Patent Office 2,693,250
Patented Nov. 2, 1954

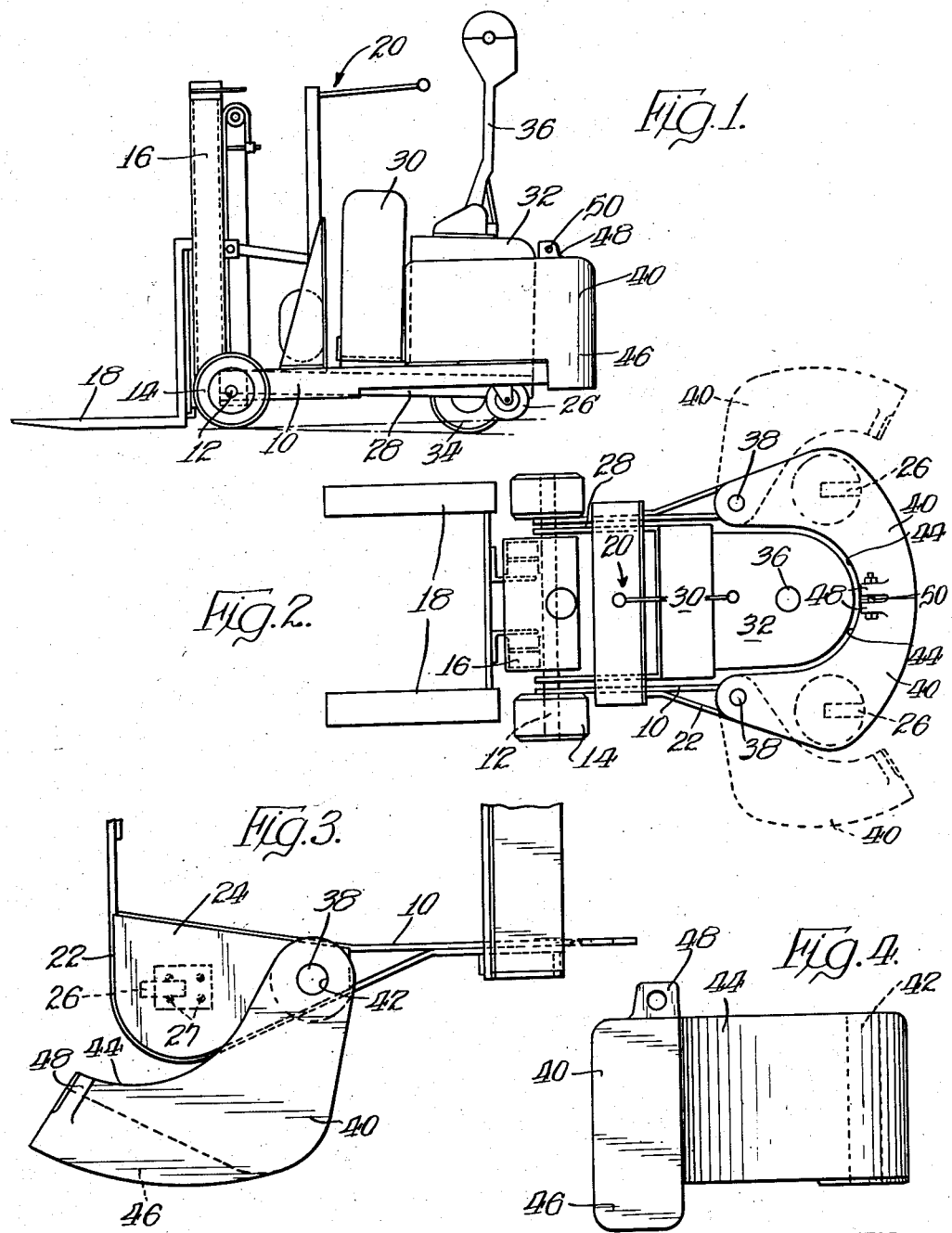

2,693,250

FORK TRUCK HAVING ADJUSTABLE COUNTERWEIGHT

Arthur M. Barrett, Winnetka, Ill., assignor to Barrett-Cravens Company, Chicago, Ill., a corporation of Illinois Application August 25, 1951, Serial No. 243,632

5 Claims. (Cl. 187—9)

The present invention relates to fork trucks adapted to raise, lower, and transport materials.

Fork trucks are well known in the material handling industry and comprise, generally, a power driven truck having an elevatable fork at and projecting beyond its forward end, the fork being adapted for insertion beneath boxes, pallets and the like for supporting same. Loads placed on the fork tend to upset the normal balance of the truck and would tip the truck were not means provided for counterbalancing the load. In the type of truck described, the load is counterbalanced by weights at the rear portion of the truck body. Accordingly, at least one of the truck wheels must be positioned beneath the weights to support same to prevent the truck from tipping when the forks are not loaded. The utilization of counterweights in the manner described requires a relatively long truck body and wheel base which leads to loss of desired maneuverability.

It is an object of the present invention to provide improved counterweights for fork trucks of the character described, whereby the length and wheel base of the trucks may be shortened considerably to provide for universal maneuverability.

Previously proposed fork trucks have utilized a supporting structure including a pair of load supporting traction wheels at the front end of the truck adjacent the mast and a pair of steering wheels at the rear end of the truck. Other fork trucks have utilized a single steering wheel at the rear of the truck.

An object of the present invention is to provide a fork truck having a wheel at each corner thereof for supporting the truck body, the fork and its elevating apparatus and the counterweights, the truck having an articulated power unit carrying a steerable driving wheel adjacent the rear end of the truck whereby the driving wheel is free to follow the contour of the surface upon which the truck is running wheel the load is firmly supported by the other four wheels.

A further object of the invention is to provide a fork truck having an articulated power unit of the character described and counterweights positioned forwardly, to the side and to the rear of the power unit.

A still further object of the invention is to provide counterweights for fork trucks of the character described wherein the counterweights are mounted on the truck body and normally extend around the sides and rear of the power unit to encompass the side and rear portions thereof, thus facilitating a decrease in the size and required wheel base of the truck.

Another object is to provide two counterweights for fork trucks, each pivotally mounted on the truck body and movable toward and away from the truck power unit to expose the power unit for repair and the like.

Other objects and advantages of the present invention will become apparent in the following detailed description of a preferred embodiment of the invention, wherein reference is made to the accompanying drawings, in which:

Figure 1 is a side elevation of a fork truck embodying the features of the present invention;

Figure 2 is a plan view of the fork truck shown in Figure 1;

Figure 3 is a plan view of one counterweight and a portion of the truck body showing the counterweight swung outwardly from the body; and Figure 4 is a side elevation of one of the counterweights of the present invention.

Referring now to the drawings, the fork truck of the present invention includes an outer or primary frame 10 which is generally U-shaped in plan, an axle 12 extending through the legs of the U-shaped frame at the outer ends thereof and wheels 14, supporting the forward end of the frame 10, suitably positioned on the axle 12 in a customary manner. A mast 16 is mounted on the axle 12 and supported by the frame 10 for movement with respect to the frame in a customary manner. Optionally, the mast 16 may be pivotally mounted on the axle 12 for tilting movement with respect to the frame 10. A fork 18 is carried and supported by the mast and extends forwardly of the wheels 14 and of the frame 10. Control means, indicated generally at 20, are provided for controlling tilting and elevating of the fork 18 and mast 16. The mast 16, the fork 18, and the controls 20 are conventional in all respects.

The outer frame 10 is enlarged at its rearward portion by arcuate frame members 22 secured to the primary frame 10. A pair of plates 24 are suitably secured to the frame members 10 and 22 and extend over the upper surfaces thereof. Swivel casters 26 of well known design and construction are suitably secured to the lower surface of each of the plates 24, such as by screws 27, to support the rearward portions of the primary frame 10.

An inner or secondary frame 28, which is also U-shaped in plan, is positioned within the confines of the U-shaped primary frame 10 and is pivotally mounted at the outer end of its legs on the axle 12 for articulated movement with respect to the primary frame 10, the mast 16, and the fork 18. A battery 30 is suitably secured in a customary manner on the secondary frame 28, as is a power unit 32. The battery 30 and power unit 32 are conventional in design and construction.

The power unit 32 includes a traction wheel 34 and means for driving the wheel. The traction wheel 34 is mounted within the power unit 32 for free rotational movement about a generally vertically extending axis. A steering handle 36 is operatively associated with the traction wheel 34 for effecting rotation thereof about the said vertical axis to provide means for steering the fork truck. Suitable controls of conventional design for controlling forward and reverse movement of the truck and for braking the truck are provided in a customary manner in the handle 36.

Due to the articulation of the frames 10 and 28, the frame 10 and apparatus carried thereby are supported by the wheels 14 and the swivel casters 26, while the power unit 32, battery 30, and secondary frame 28 are supported by the axle 12 and the traction wheel 34 so that the traction wheel 34 may follow the contour of the surface upon which the truck is riding independently of the main frame, as is shown in Figure 1, whereby positive driving traction is constantly provided. Due further to this particular construction, the load is firmly supported by the wheels 14 and the casters 26 so that the stability of the truck is never jeopardized despite irregularities in the surface upon which the truck is riding.

Posts 38 are secured to the plates 24 and frame members 10 and 22 to either side of the power unit 32. Weights 40, which are generally arcuate in plan, are provided at one end with holes 42 for the reception of the posts 38 whereby the weights 40 are pivotally supported on the primary frame 10 by means of the posts 38. The weights 40 are mounted for free swinging movement on the primary frame 10 and are adapted to be swung toward one another and toward the power unit 32 to bring the ends thereof opposite the bores 42 into abutting relationship. The weights 40 are provided with arcuate inner surfaces 44 adapted to conform to the external configuration of the power unit 32. The weights 40 are each provided at the rear portions thereof with a downwardly projecting extension 46 adapted to extend over the rear surfaces of the frame 10 and provide substantial weight at the rear end of the truck to counterbalance any load positioned upon the fork 18. The weights 40 are each provided with smooth and gradually curved surfaces so as to present a streamlined appearance which is esthetically desirable.

On the upper surface of each of the weights 40 adjacent the ends thereof adapted to be brought into abutting relationship, a lug 48 is provided having an aperture therein for the reception of a bolt 50 for securing the weights together in abutting relationship, as shown in solid lines in Figure 2, in which position the weights encompass the side and rear portion of the power unit 32. The arcuate inner surfaces 44 of the weights 40 are preferably spaced from the sides of the power unit 32 to accommodate the articulated movement of the power unit 32 and secondary frame 28 with respect to the primary frame 10 and the weights 40. The weights 40 are normally disposed in the position shown in solid lines in Figure 2, but the bolt 50 may be removed to accommodate movement of the weights 40 to the position shown in dotted lines in Figure 2 and in solid lines in Figure 3 to expose the power unit 32 for repair or the like.

As will be apparent from Figures 1 and 2, the weights 40 extend forwardly of, along the sides of, and to the rear of the power unit 32, substantial portions of the weights being disposed to the sides and forwardly of the power unit so that the total mass of the weights is not positioned to the rear of the power unit. Due to the provision of the extensions 46, the portion of the weights extending to the rear of the power unit is of relatively small dimension. Accordingly, the primary frame 10 is substantially shorter than was heretofore regarded as possible and, consequently, the wheel base of the fork truck may be considerably shortened, thereby increasing the maneuverability of the truck.

From the foregoing, it will be apparent that the present invention provides a fork truck of substantially smaller dimensions than fork trucks commercially available. The truck of the present invention has greater maneuverability and is capable of being moved into smaller areas than are conventional trucks of the general type. Accordingly, with the fork truck of the present invention, articles may be stacked or stored in more compact relationship, with the various rows of stacked or stored articles being disposed closer together than is possible with conventional trucks resulting in consequent savings in storage and warehouse space. Furthermore, the provision of the articulated construction of the present invention insures constant tractive force for the truck, the weight of the battery 30 and the power unit 32 being of sufficient magnitude to insure positive driving traction at all times between the wheel 34 and the surface upon which the truck is riding.

While I have described what I regard to be a preferred embodiment of my invention, it will be apparent that various changes, modifications, and rearrangements may be made therein without departing from the spirit and scope of the invention, as defined by the appended claims.

I claim:

1. In a fork truck of the character described, a primary frame, a pair of wheels supporting one end of said primary frame, a pair of casters supporting the other end of said primary frame, a secondary frame pivotally associated at one end with said primary frame at the end thereof supported by said wheels, and a power unit mounted on said secondary frame at the end thereof opposite the pivotal association of said frames and adjacent the end of said primary frame supported by said casters, said power unit including a steerable traction wheel supporting the end of said secondary frame adjacent the end of said primary frame supported by said casters whereby said traction wheel and said secondary frame are movable independently of said primary frame to follow irregularities in the surface upon which the truck is riding.

2. A counterweight for fork lift trucks of the character described, comprising a body member, said body member being generally arcuate in plan and having a bore therein at one end thereof, an extension on said body member at the end thereof opposite said bore, said extension projecting from one surface of said body member in a plane generally parallel to the axis of said bore, and an apertured lug extending from the surface of said body member opposite the surface from which said extension projects.

3. In a fork truck of the character described having a tiltable and elevatable mast and fork, and means counterbalancing the mast and fork, the combination comprising an outer U-shaped frame for supporting the mast and fork and the counterbalancing means, an inner U-shaped frame positioned within and encompassed by said outer frame, the legs of said frames extending adjacent each other, said frames being pivotally connected at the outer ends of their legs, and traction means carried by said inner frame for articulated movement with respect to said outer frame.

4. In a fork truck of the character described having a tiltable and elevatable mast and fork, and means counterbalancing the mast and fork, the combination comprising an outer U-shaped frame, an inner U-shaped frame positioned within and encompassed by said outer frame, the legs of said frames extending adjacent each other, said frames being pivotally connected at the outer ends of their legs, and traction means carried by said inner frame for articulated movement with respect to said outer frame, said outer frame supporting the mast and fork and the counterbalancing means, the counterbalancing means comprising a pair of weights each pivotally mounted on one side of said outer frame intermediate the ends of said outer frame, said weights being generally arcuate in form to conform to the closed end of said outer frame and being adapted to be swung inwardly toward said outer frame and outwardly away from said outer frame.

5. In a fork truck having a load and counterweight supporting frame and a power unit articulated to the frame for driving the truck, the improvement comprising pivotally mounting a counterweight on each side of the power unit for swinging movement toward and away from the power unit, said counterweights being normally swung toward the power unit and secured together to encompass the side and rear portions of the power unit but being spaced therefrom to accommodate articulated movement of the power unit.

References Cited in the file of this patent

UNITED STATES PATENTS

| Number | Name | Date |
| --- | --- | --- |
| 2,261,870 | Cardwell | Nov. 4, 1941 |
| 2,299,445 | Weaver | Oct. 20, 1942 |
| 2,364,493 | Ulinski | Dec. 5, 1944 |
| 2,395,345 | Schreck | Feb. 19, 1946 |
| 2,503,181 | Wagner | Apr. 4, 1950 |
| 2,504,885 | Schreck | Apr. 18, 1950 |
| 2,613,828 | Elliott et al. | Oct. 14, 1952 |